(12) United States Patent
Hayden

(10) Patent No.: US 6,665,727 B2
(45) Date of Patent: Dec. 16, 2003

(54) DYNAMIC ASSIGNMENT OF MULTICAST NETWORK ADDRESSES

(75) Inventor: Peter C. Hayden, Mont Vernon, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/128,007

(22) Filed: Apr. 22, 2002

(65) Prior Publication Data

US 2002/0116529 A1 Aug. 22, 2002

Related U.S. Application Data

(62) Division of application No. 09/480,904, filed on Jan. 11, 2000, now Pat. No. 6,377,997, which is a continuation of application No. 07/981,274, filed on Nov. 25, 1992, now Pat. No. 6,018,771.

(51) Int. Cl.[7] ............................................. G06F 15/16
(52) U.S. Cl. .................... 709/231; 709/200; 370/85.13; 370/392; 340/825.5
(58) Field of Search .......................... 709/231, 200; 370/85.13, 392; 340/825.5

(56) References Cited

U.S. PATENT DOCUMENTS

| | | | | |
|---|---|---|---|---|
| 4,590,467 A | * | 5/1986 | Lare | 340/825.5 |
| 4,792,947 A | * | 12/1988 | Takiyasu et al. | 370/452 |
| 5,058,109 A | * | 10/1991 | Goldberg et al. | 370/401 |
| 5,079,767 A | | 1/1992 | Perlman | |
| 5,150,464 A | * | 9/1992 | Sidhu et al. | 709/222 |
| 5,276,442 A | | 1/1994 | Cree et al. | |
| 5,287,346 A | * | 2/1994 | Bianchini, Jr. et al. | 370/390 |
| 5,309,433 A | * | 5/1994 | Cidon et al. | 370/390 |
| 5,323,388 A | * | 6/1994 | Chang et al. | 370/353 |
| 5,425,028 A | * | 6/1995 | Britton et al. | 370/389 |
| 5,732,094 A | * | 3/1998 | Petersen et al. | 370/445 |
| 5,842,224 A | * | 11/1998 | Fenner | 370/392 |
| 5,956,335 A | * | 9/1999 | Backes et al. | 370/392 |
| 6,018,771 A | | 1/2000 | Hayden | |

OTHER PUBLICATIONS

IEEE Standards for Local Area Networks: Carrier Sense Multiple Access with Collision Detection (CSMA/CD) Access Method and Physical Layer Specifications, IEEE Std. 802.3 (1985) :23–32.
FDDI Station Management (SMJ), Preliminary Draft Proposed American National Standard, ANSI Std. X3T9 (1992):117–126.

* cited by examiner

Primary Examiner—David Wiley
Assistant Examiner—David England

(57) ABSTRACT

Multicast addresses on a computer network are dynamically assigned to a temporary node task. In particular, a server dynamically assigns a multicast address to a data stream in response to a request for the data stream from a client. The server assigns the multicast address in cooperation with other servers from a pool of network-allocated but unassigned multicast addresses. Once the data stream is terminated, the assigned multicast address is deassigned and returned to the pool of unassigned multicast addresses for possible reuse by the nodes.

66 Claims, 6 Drawing Sheets

DYNAMIC ASSIGNMENT OF MULTICAST NETWORK ADDRESSES

RELATED APPLICATION

This application is a divisional of U.S. Application Ser. No. 09/480,904, filed Jan. 11, 2000, now U.S. Pat. No. 6,377,997 which is also a continuation of U.S. Application Ser. No. 07/981,274, filed Nov. 25, 1992, now U.S. Pat. No. 6,018,771 the entire teachings of which are incorporated herein by reference in their entirety.

BACKGROUND OF THE INVENTION

In computer networks, it is often desirable for one node to transmit data over a network so the data can be received by all other nodes connected to the network. To accomplish the transmitting, a pool of multicast (group) addresses may be allocated to each network by a network standards body, such as the Institute of Electrical and Electronic Engineers (IEEE) or the American National Standards Institute (ANSI). Any node on the network can read data being transmitted on a multicast address. The standards body guarantees that allocated multicast addresses do not overlap between networks.

Traditionally, multicast addresses were assigned from the pool one at a time, each multicast address serving a specific purpose or function. For example, there are specific multicast addresses assigned for Ethernet end-station "hello" messages, LAT service announcements, and Fiber Distributed Data Interface (FDDI) status reporting frames. Each assigned multicast address serves one explicit function. To prevent a node that is receiving one data stream from being inundated by other data streams, a unique multicast address is required for each unique data stream.

A problem with the traditional assignment method is that each multicast address on a network is assigned for a single specific purpose or function. As the number of specific functions on the network increases, more multicast addresses from the network's allocated pool are assigned to meet the need. Once the network's pool of allocated multicast addresses is depleted, the network must be allocated an additional pool of multicast addresses. This in turn depletes more addresses from the finite set of addresses that are available to be allocated to the various networks.

While many multicast addresses may be allocated to a network and assigned by the network for specific functions, only a relatively few multicast addresses may be in use on the network at any one time. Indeed, many multicast addresses may be used infrequently because the associated functions are in low demand. Networks are thus expanding their pool of multicast addresses while not using all multicast addresses already allocated to the networks.

SUMMARY OF THE INVENTION

There are effectively an infinite number of arbitrary individual data streams available for transmitting over a network. For example, in a computer network accessing video programs, there may be one data stream for each movie, television program, and video image available to the public. Therefore, it is impractical to assign a unique multicast address for every possible data stream. A mechanism to assign a unique multicast address from a finite set of addresses for the duration of the data stream is an ideal solution. The preferred approach is completely distributed and lacks a central agent for assigning the multicast addresses. Therefore, this approach is reliable as nodes join and leave a local area network (LAN).

In addition, it is highly desirable not to force interested nodes on the network to receive unwanted data streams. At the same time, for those nodes that do want to receive a data stream, it is desirable that only the data stream in which the node is interested be received.

The invention provides a general mechanism in which a node on a network can dynamically assign a single multicast address from a network-wide pool of unassigned multicast addresses, and subsequently use that assigned address for the node's own purposes. When the assigned address is no longer needed, it is returned to the pool. This dynamic assignment permits networks to use fewer multicast addresses then would be required if they were assigned in a more traditional basis where a unique address is assigned for each possible function.

The invention pertains to a computer network having a transmitter node for transmitting a particular data stream to at least one receiver node. A node's classification as a transmitter or receiver may vary based on the data stream being transmitted or the network protocol. A data stream is transmitted to a dynamically assigned multicast address by first selecting a candidate multicast address that is not being used by any node on the network. An announcement is transmitted at a dedicated announcement multicast address to notify potential receiver nodes and other transmitter nodes that the candidate multicast address has been assigned. Finally, the transmitter node transmits the data stream at the candidate multicast address.

Prior to transmission of a service data stream, available services may be identified on the announcement multicast address. Nodes may forward commands to the transmitter node to initialize transmission on candidate addresses. Transmitter nodes may also automatically transmit a particular data stream without receiving a command for that data stream. Thereafter, the services are identified on the announcement address with their candidate addresses so that any node may receive the transmitted data streams.

The transmitter nodes also monitor the dedicated multicast address to identify conflicts between the selected candidate address and addresses announced by other nodes and to resolve the conflicts by selecting new candidate addresses.

In particular, a preferred system for transmitting video data streams over a computer network is described. The system comprises video sources, each video source having access to at least one video program. On the computer network are client nodes and server nodes. A user on a client node may have an interest in various video programs. The server nodes are in communication with the video sources and respond to commands received from the client nodes. Specifically, the server nodes select particular video programs from the video sources, either automatically or in response to client node commands for the particular video program. There are a plurality of multicast addresses allocated to the computer network. One such multicast address is used cooperatively by the server nodes to announce information regarding available video programs to all client nodes. The remaining pool of multicast addresses is used by the server nodes to transmit video programs to any and all interested client nodes. The server nodes cooperatively manage the dynamic assignment of multicast addresses so that multicast addresses are exclusively assigned to a single video program while that video program is being transmitted. After the video program transmission terminates, the assigned multicast address is deassigned and returned to the pool of unassigned multicast addresses for possible reassignment.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views.

DETAILED DESCRIPTION OF THE INVENTION

Figure 1:
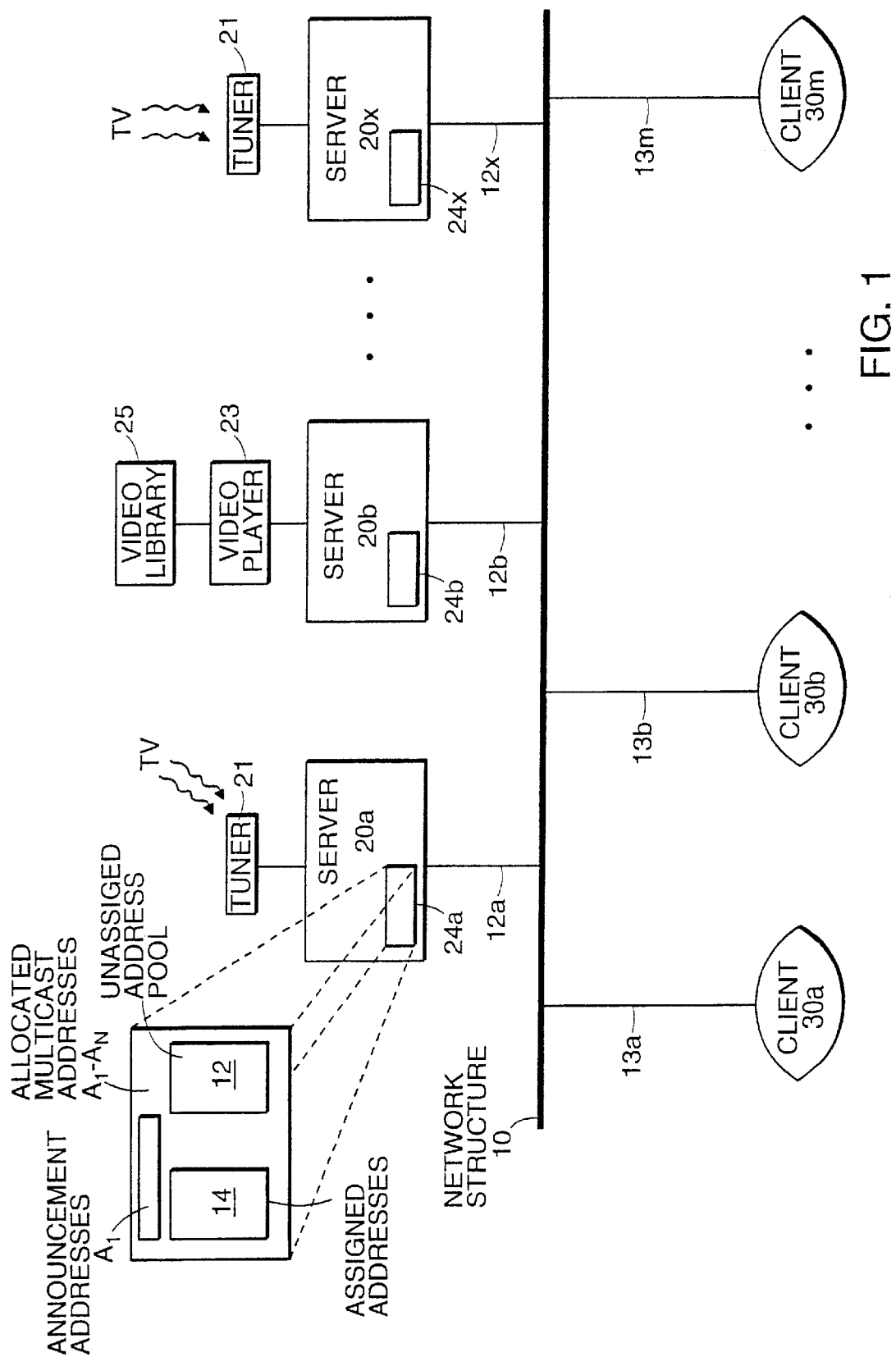
FIG. 1 is a schematic block diagram of computer network adapted for transmitting video data streams.

FIG. 1 is a schematic block diagram of a typical computer network adapted for accessing video data streams. The network comprises a network structure 10, server nodes 20$a$–$x$, and client nodes 30$a$–$m$. The network structure 10 may be any applicable network configuration, such as a star-wired or a bus topology. Server nodes 20$a$–$x$ perform tasks for the network. The server nodes 20$a$–$x$ are connected to the network structure 10 by respective cabling 12$a$–$x$. Likewise, the client nodes 30$a$–$m$ are connected to the network structure 10 by respective cabling 13$a$–$m$. The client nodes 30$a$–$m$ are operated by users accessing the network. The network may be compatible with any network protocol supporting multicast addresses, including Ethernet, IEEE 802.3, and FDDI (ANSI X3T9.5). Although a preferred embodiment is described in terms of video data streams, the invention applies to computer networks for transmitting any data streams between nodes.

The network 10 is allocated at least one block of N multicast addresses $A_1$–$A_n$ according to the particular network protocol. One of the allocated multicast address $A_1$ is an announcement address. Each server 20$a$–$x$ periodically transmits announcement messages on the announcement address $A_1$. The selection of the announcement interval is a trade-off between announcing frequently so that clients 30$a$–$m$ can rapidly access data and avoiding an unnecessary load on the network 10 and the servers 20$a$–$x$. In a preferred embodiment of the invention, the announcement interval is on the order of a few seconds. The remaining allocated multicast addresses $A_2$–$A_n$ are considered to be in either a pool of unassigned multicast addresses 12 or a table of assigned multicast addresses 14. These remaining multicast addresses $A_2$–$A_n$ are cooperatively assigned by the servers 20$a$–$x$ and readable by all servers 20$a$–$x$ and all clients 30$a$–$m$ on the network 10.

In a preferred embodiment, the cooperation between the servers is entirely distributed. Instead of using a central database, each server node 20$a$–$x$ on the network 10 maintains a view of the multicast addresses $A_1$–$A_n$. The server nodes 20$a$–$x$ maintain respective views 24$a$–$x$, the views are maintained in the respective node's local address space. Assignment information is shared between the nodes on the network 10. Changes in the assignment status of the multicast addresses are tracked by the server nodes 20$a$–$x$. From the announcement address $A_1$, the client nodes 30$a$–$m$ may track the data streams being transmitted on the assigned multicast addresses. On a steady-state network 10, all server views 24$a$–$x$ are synchronized to be identical.

In a preferred embodiment of the invention, the server nodes 20$a$–$x$ service video data for the client nodes 30$a$–$m$. Connected to the server nodes 20$a$–$x$ may be such devices as tuners 21 and video players 23. Tuners 21 may collect TV video signals from local broadcasts or satellites. Video players 23 may be video cassette players or CD ROMs connected to a video library 25. For simplicity and clarity of description, each server node 20 is shown connected to one video device. A server node 20 may have access to more than one video device, and each video device may in turn be of a separate type.

The server nodes 20$a$–$x$ typically compress video signals into video data streams for transmission over the network structure 10. Client nodes 30$a$–$m$ receive the video data streams. The client nodes 30$a$–$m$ may then manipulate the video data streams, decompress the video data streams into video signals for display or recording, or otherwise process the video data streams.

Figure 2:
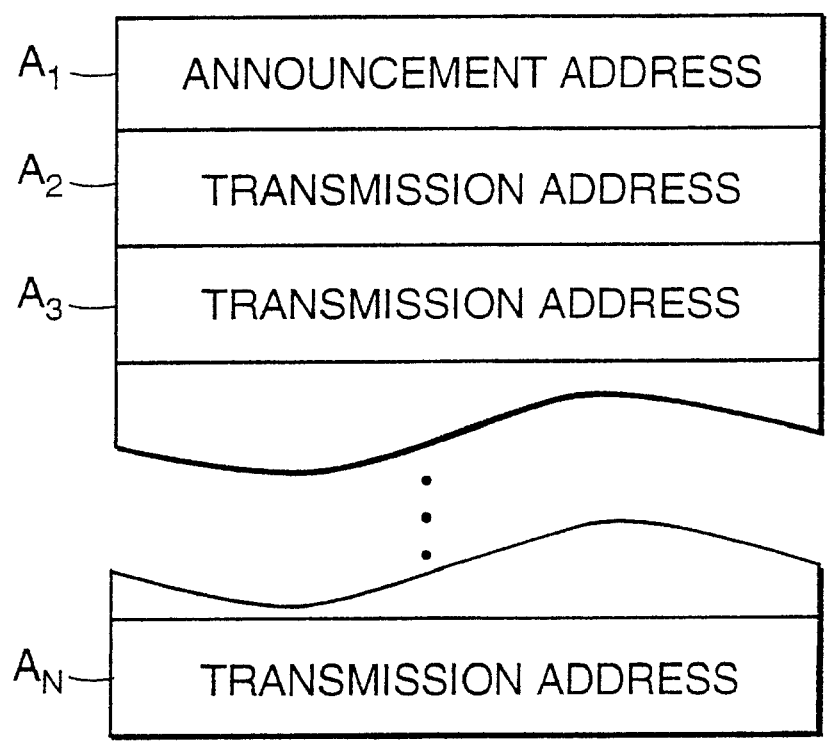
FIG. 2 is a block diagram of the multicast addresses $A_1$–$A_N$ available on network 10 of FIG. 1.

Server nodes 20$a$–$x$ transmit the video data streams over the network 10 by using multicast addresses. FIG. 2 shows the address assignments for the N multicast addresses allocated to the network. Address $A_1$ is the announcement address. A single announcement address $A_1$ on the network is used by all servers 20$a$–$x$ to supply video program information to all clients 30$a$–$m$. Addresses $A_2$–$A_n$ are assignable transmission addresses. The servers 20$a$–$x$ use the assignable transmission addresses $A_2$–$A_n$ to transmit the video data streams to the clients 30$a$–$m$.

Figure 3:
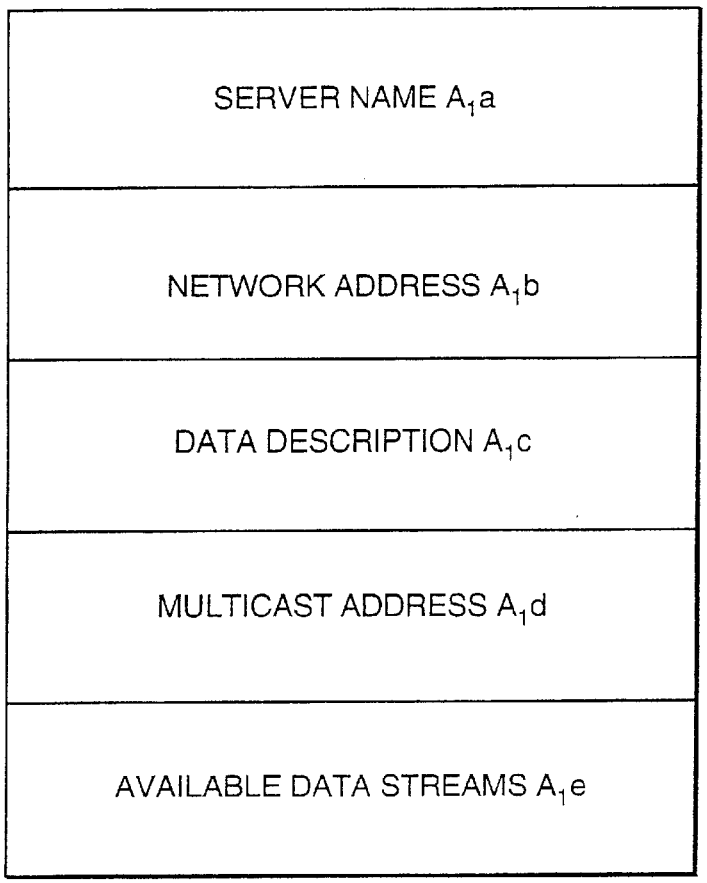
FIG. 3 is a schematic block diagram of the announcement address $A_1$ of FIG.

FIG. 3 shows the relevant fields of the data packets 16 available at the announcement address $A_1$. Each announcement packet 16 contains fields for the server name $A_1$a, the network address of the server $A_1$b, the description of data streams being transmitted by the server $A_1$c, the multicast address where the video data is being transmitted $A_1$d, and a list of data streams available from the server $A_1$e. The description of a data stream is unique for that data stream, regardless of the network on which the data stream is available. The use of unique descriptions promotes conflict resolution as networks are linked together. In addition to the identified fields, the announcement packet 16 may have additional fields. FIG. 3 does not limit the, number nor the size of fields available in the announcement packet 16. For example, the announcement packet 16 may supply a database address where the client 30 can randomly access pertinent information, such as an index of available video programs cross-referenced to servers capable of providing the video program and servers currently transmitting the video program over the network.

Figure 4:
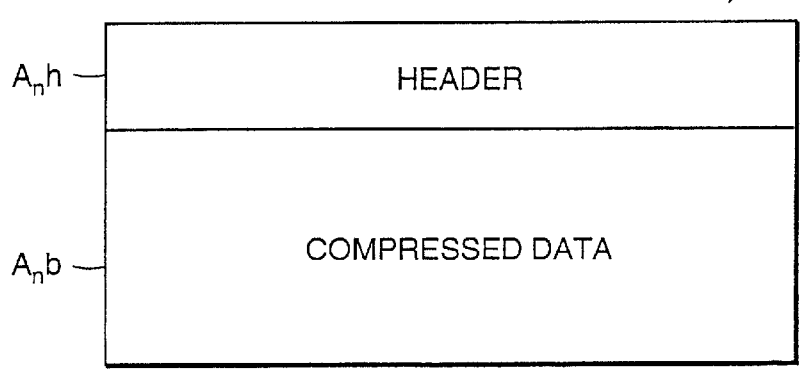
FIG. 4 is a schematic block diagram of a transmission address $A_n$ of FIG. 2.

FIG. 4 shows the relevant fields of a data packet 18 available at a transmission address $A_n$. The transmission packet 18 contains a header field $A_n$h for identifying such information as the sending server and the data stream and a field $A_n$b containing a frame of the data stream. FIG. 4 does not limit the number of fields available in the transmission packet 18 nor the size of the fields.

Figure 5A:
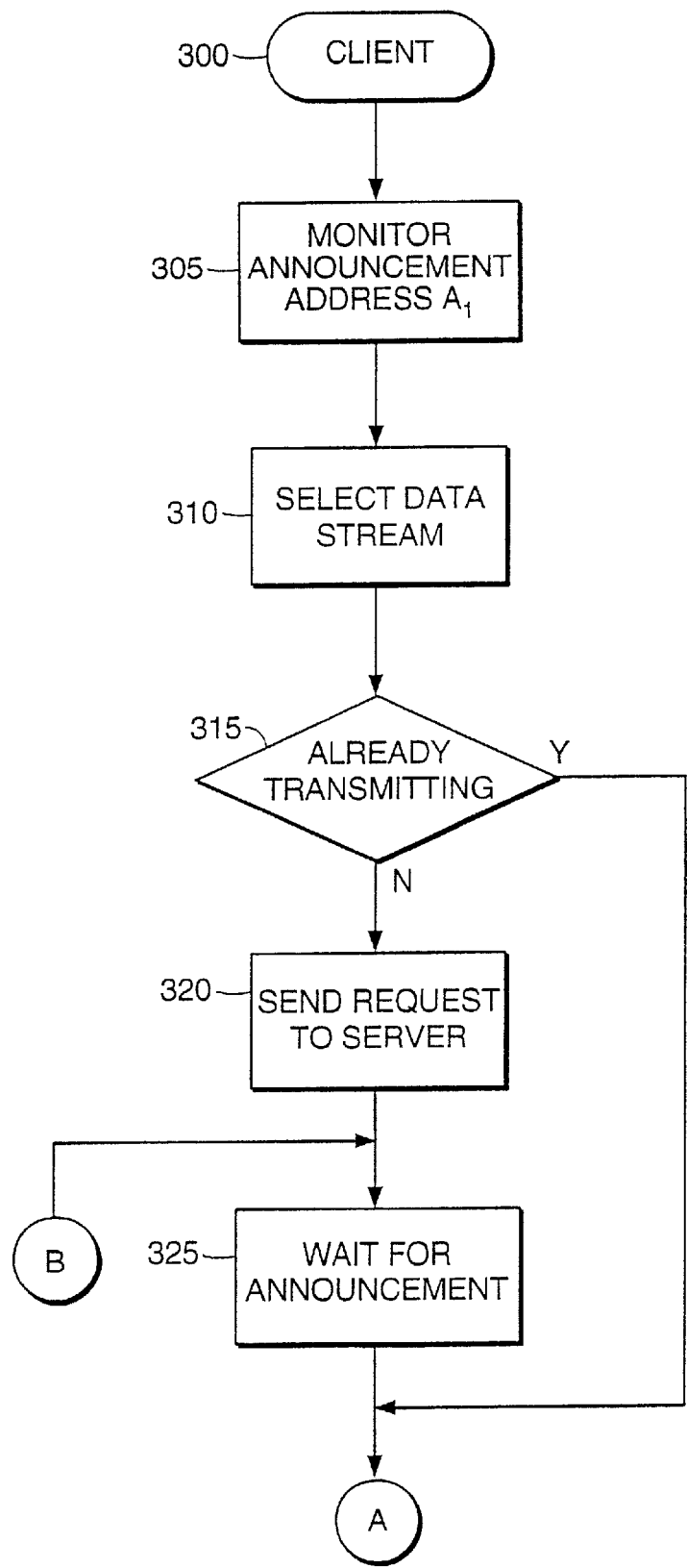
FIGS. 5A and 5B are a flow chart showing the steps performed by a client node 30 of FIG. 1.
Figure 5B:
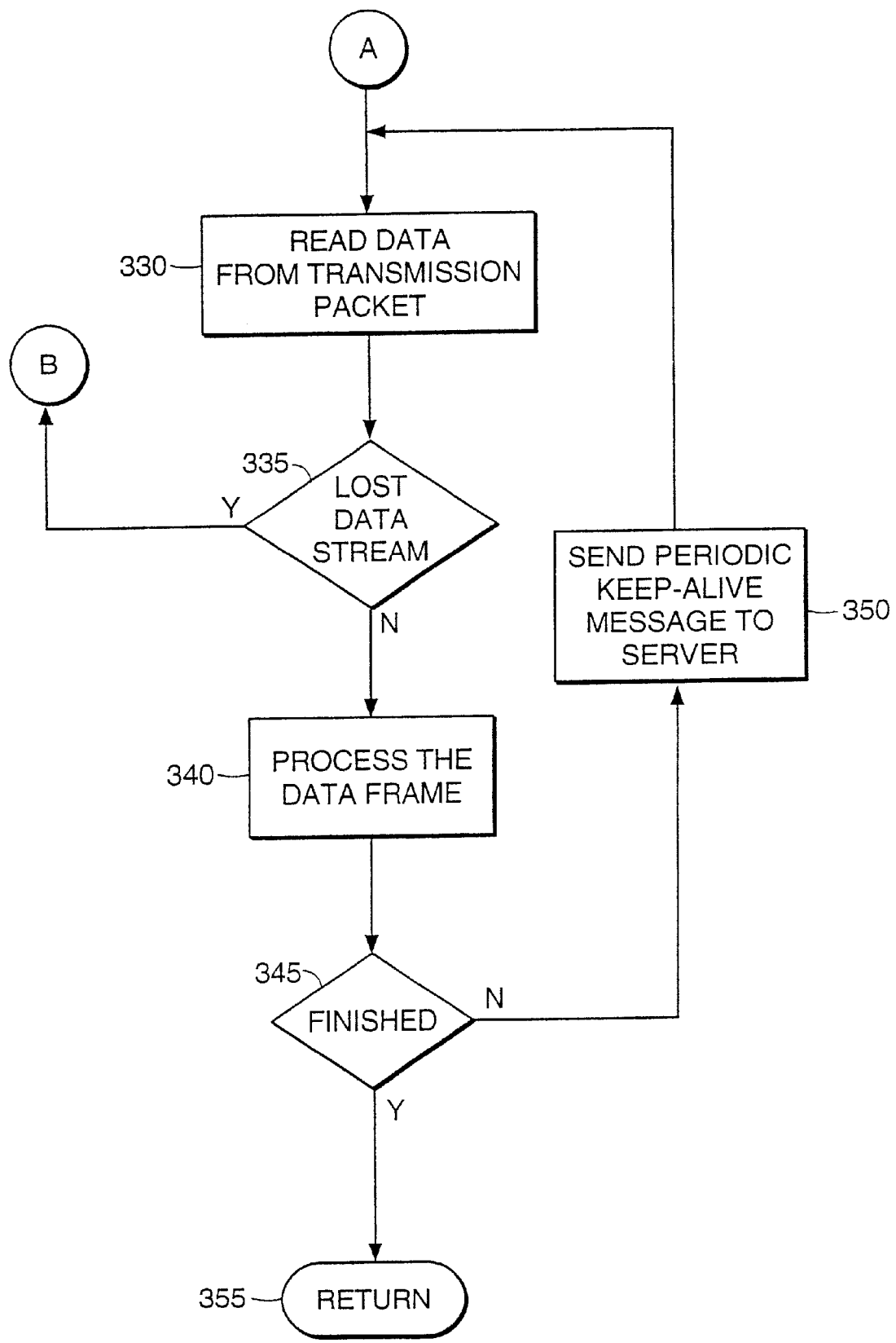

FIGS. 5A and 5B provide a flow chart of the processing performed by the client nodes 30$a$–$m$. Client processing begins at step 300 of FIG. 5A. As shown at step 305, the client 30 monitors the announcement address $A_1$. By monitoring the announcement packets 16 at announcement address $A_1$, the client 30 can generate a list of all video programs being transmitted by each server 20 and all available video programs that the servers 20$a$–$x$ are capable of transmitting. At step 310, the client 30 selects a video data stream in which a user is interested. To continue, the client 30 must determine whether the selected video data stream is already being transmitted by a server 20, as shown at step 315.

If the selected video data stream is not currently being transmitted, the client 30 must cause a server 20 to transmit the video data stream. At step 320, the client 30 sends a request over the network to an appropriate server 20 having access to the desired video data stream. The request instructs the server 20 to transmit over the network the video data stream from its video source. The client 30 then waits for an announcement from the server 20, shown at 325. The announcement for the video data stream will contain the transmission address $A_n$ for the video data stream in the transmission address field $A_1d$.

After reviewing the request sent by a client at 320, the server 20 determines a transmission address $A_n$ from available addresses as discussed below and announces that transmission address $A_n$ in the transmission address field $A_1d$ at announcement address $A_1$. The server 20 then transmits a video data stream comprising frames of data at the transmission address $A_n$. To read the data stream, a client 30 reads continuous data packets 18 at the transmission address $A_n$.

Turning to step 330 of FIG. 5B, the client 30 reads data from a transmission packet 18. In the header $A_nh$ of each transmission packet 18 is information indicating the identity of the server 20 sending the video data and a description of the video data. As shown at step 335, if the client 30 does not read an expected header from the transmission address, then the client 30 may have lost the video data stream. In the case of a lost data stream, the client 30 waits for a new announcement at step 325. As discussed below, the transmission address $A_n$ for the video data stream may be changed by the server 20 because of conflicts between servers over the transmission address $A_n$.

In an alternative embodiment of the invention, the client 30 monitors the announcement address $A_1$ for any new announcements related to video programs in which the users are interested. Upon detecting a change in the transmission address $A_n$, the client 30 switches to a new transmission address $A_n$ to read the video data stream.

If the client 30 reads a proper transmission packet 18, then the client 30 processes the data frame $A_nb$ at step 340. Processing the data frame $A_nb$ may involve manipulating the data or decompressing the data to create a video image.

The steps of reading and processing transmission packets 18 continues until the client 30 is finished with the video data stream. Periodically, the client 30 sends a keep-alive message to the server 20. For example, the client 30 sends a keep-alive message at rate T/2, where T is the server timeout period (described below). The keep-alive message informs the server 20 that the client 30 is still reading the video data stream. As long as a client 30 is reading the data, the server 20 will continue to transmit the video data stream on the transmission address $A_n$. The step of sending the periodic keep-alive message is shown at step 350. A client 30 that does not send periodic keep-alive messages may read the video data steam, but that client 30 risks having the data stream terminate without notice. When the client 30 finishes reading the video data stream, processing ends and the routine returns at step 355.

In an alternative embodiment of the invention, the client 30 sends a message to a server 20 whenever the client 30 starts to read a data stream from a transmission address $A_n$ assigned to that server 20. The client 30 then sends a message to the transmitting server 20 when it stops reading from the transmission address $A_n$. The server 20 continues to transmit the data stream at the transmission address $A_n$ until the count of clients 30a–m reading the transmission address $A_n$ becomes zero. Unfortunately, the server 20 is not guaranteed to receive either the start or stop message. If a start message is not received by the server 20, then the server 20 may terminate a transmission while a client 30 is reading the data stream. If a stop message is not received by the server 20, then the server 20 may continue to transmit a data stream indefinitely. Consequently, this alternative embodiment is less desirable than the keep-alive embodiment.

In an alternative embodiment of the invention, a client 30 may generate the list of video programs by scanning the multicast addresses $A_2$–$A_n$ and sampling transmission packets 18. Active transmissions can be identified by the existence of a transmission packet 18 at a multicast address $A_n$. By reading the header $A_nh$ of the transmission packet 18, the client 30 can determine the contents of the transmission on that transmission address. From the header $A_nh$ of the transmission packet 18, the client 30 can generate a list of video programs on assigned multicast addresses without accessing an announcement address $A_1$.

Similarly, the announcement address may only provide clients 30a–m with assigned multicast addresses $A_1d$ without a description of the data stream $A_1c$. In that case, the client 30 can generate a list of assigned multicast addresses. By using the list of assigned multicast addresses, instead of the larger set of allocated multicast addresses $A_2$–$A_n$, the client 30 can reduce the scanning time.

Figure 6:
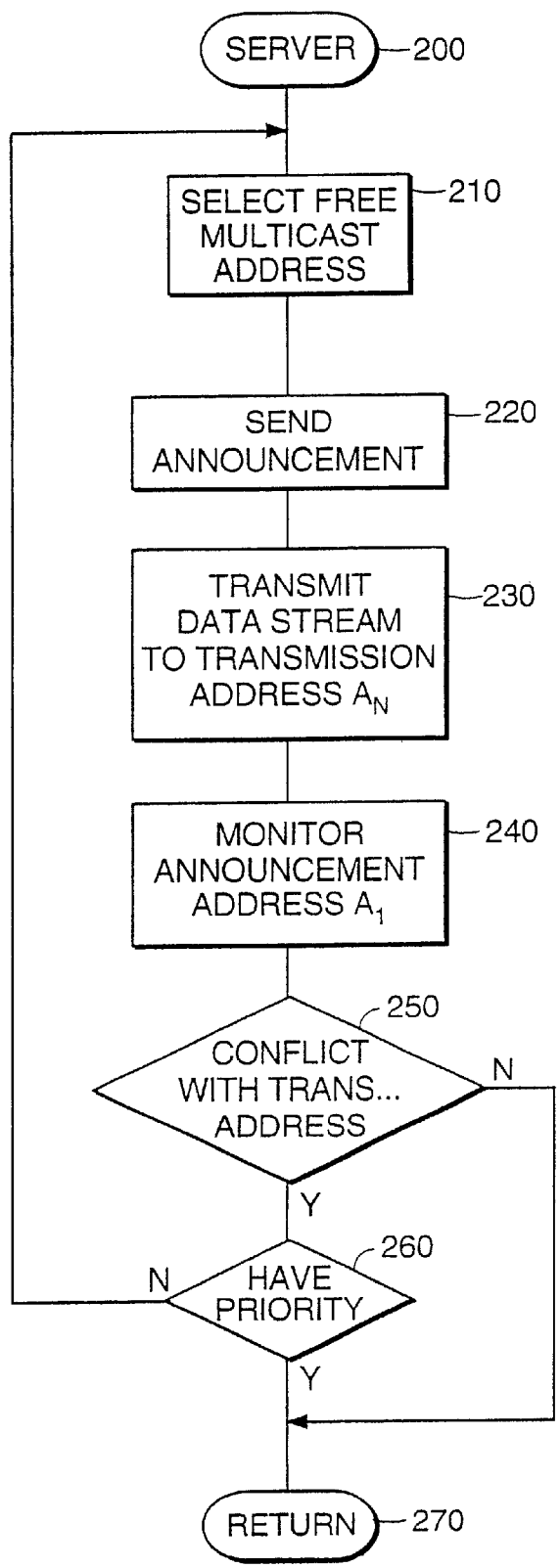
FIG. 6 is a flow chart showing the steps performed by a server node 20 of FIG. 1.

FIG. 6 is a flow chart of the server 20 processing steps. At network initialization, all non-dedicated multicast addresses $A_2$–$A_n$ are unassigned and are in the pool of unassigned multicast addresses 12. The processing is initiated by a client request for a video data stream that is not being transmitted over the network 10. Alternatively, the server 20 may automatically transmit particular video data streams independent of client requests. For example, a server 20 may transmit the particular video data stream during the duration of that data stream's availability (e.g. news broadcasts, network programming, etc.). After the video data stream is selected, the server 20 must select a multicast address for transmitting the particular video data stream.

Upon entry at step 200, the server 20 selects a candidate transmission address $A_n$ from the pool of unassigned multicast addresses 12, as shown in step 210. In a preferred embodiment of the invention, the server 20 selects addresses from the pool of unassigned multicast addresses 12 in a random fashion. In an alternative embodiment of the invention, the server 20 sequentially selects the next available address from the pool of unassigned multicast addresses 12. Once a candidate transmission address $A_n$ is selected, the server 20 must notify the client 30 and other servers 20a–x of the selection.

The server 20 notifies the clients 30a–m and the other servers 20a–x by sending an announcement message at step 220. The announcement is sent over the announcement address $A_1$ as shown in FIG. 3. To facilitate rapid recognition by the clients 30a–m and other servers 20a–x, the announcement message is queued to the announcement address $A_1$ immediately. In a preferred embodiment of the invention, two announcement messages are sent in succession at step 220. Preferably, the announcement message is sent twice during the currently active announcement interval. After the announcement messages have been queued to the announcement address $A_1$, the server 20 is ready to transmit the video data stream.

The server 20 transmits the video data stream at step 230. The video data stream is transmitted at the transmission address $A_n$. In a preferred embodiment, there is only one video data stream being transmitted at a transmission address $A_n$ during steady state. However, it is possible that multiple servers 20a–x may simultaneously select an identical candidate transmission address $A_n$ from the pool of unassigned multicast addresses 12. In that case, there would be a conflict over a selected transmission address $A_n$. Until the conflict is resolved, there may be multiple servers 20a–x transmitting on a single transmission address $A_n$. Because clients 30a–m read only data frames carrying requested information, the system can tolerate short-term conflicts over a multicast address. However, to promote network efficiency, conflicts over a multicast address are resolved so that only one data stream is transmitted per multicast address.

The servers 20a–x are responsible for resolving conflicts over transmission addresses. Each server 20 monitors the announcement address $A_1$ as shown at step 240. By monitoring the announcement address $A_1$, each server 20 maintains a local table of assigned multicast addresses 14 in a local view 24. Alternatively, the table may be cooperatively maintained in a shared database. In particular, the server 20 recognizes conflicts between itself and other servers 20a–x over a transmission address $A_n$.

Once a conflict is detected, as shown at step 250, the servers 20a–x resolve the conflict. In a preferred embodiment of the invention, a priority system is used to resolve the conflict as shown at step 260. In a preferred embodiment of the invention, a server's priority is based on the server's network address. In particular, a server 20 having a numerically higher-valued network address has priority over a server 20 having a numerically lower-valued network address. The server 20 with the highest numeric network address will keep the selected transmission address $A_n$.

Alternatively, numerically lower-valued network addresses could provide priority over numerically higher-valued network addresses. All other servers 20 that conflict with the priority server 20, will select another candidate transmission address $A_n$, from the pool of unassigned multicast addresses 12 and continue at step 210.

If no conflict is detected or if the server 20 has the highest priority, the selected candidate transmission address $A_n$ becomes assigned to the server 20. The processing then returns to the calling routine at 270.

Typically, the assignment and transmitting continue until there are no clients 30a–m signaling an interested in the data stream to the server 20. In a preferred embodiment, the server 20 terminates the transmission and deassigns the multicast address when no keep-alive messages are received within a time-out period, T. A reasonable time-out period is ten minutes (T=10 min). In an alternative embodiment of the invention, the server 20 terminates the transmission and deassigns the multicast address when the count of clients 30a–m reading the data stream becomes zero. If the data stream is being automatically transmitted, then the server 20 may automatically terminate the transmission, such as at the end of a transmission duration.

Equivalents

Those skilled in the art will know, or be able to ascertain using no more than routine experimentation many equivalents to specific embodiments to the invention described herein.

These and all other equivalents are intended to be encompassed by the following claims.

What is claimed is:

1. On a computer network, a method of assigning a multicast address to a data stream for communicating content over the computer network, comprising:
   grouping a plurality of unused multicast addresses into a pool; and
   assigning a multicast address from the pool to a data stream without regard to the content of the data stream.

2. The method of claim 1 further comprising:
   deassigning the assigned multicast address from the data stream.

3. The method of claim 2 wherein deassigning comprises returning the multicast address to the pool.

4. The method of claim 1 wherein assigning is responsive to a request for transmission of the data stream.

5. The method of claim 1 wherein assigning comprises randomly selecting the multicast address.

6. The method of claim 1 further comprising resolving a conflict over the multicast address from the pool.

7. The method of claim 1 wherein assigning comprises removing the multicast address from the pool.

8. The method of claim 1 wherein the unused multicast addresses are allocated to the computer network, but not used by any computer on the computer network.

9. The method of claim 1 wherein the data stream content includes audio data.

10. The method of claim 1 wherein the data stream content includes video data.

11. On a computer network, a system for assigning a multicast address to a data stream for communicating content over the computer network, comprising:
    a plurality of unused multicast addresses grouped into a pool; and
    an assignment function for assigning a multicast address from the pool to a data stream without regard to the content of the data stream.

12. The system of claim 11 further comprising:
    a deassignment function for deassigning the multicast address from the data stream.

13. The system of claim 12 wherein the deassignment function includes a return function for returning the removed multicast address to the pool.

14. The system of claim 11 wherein the assignment function is responsive to a request for transmission of the data stream.

15. The system of claim 11 wherein the assignment function randomly selects the multicast address from the pool.

16. The system of claim 11 further comprising a resolver function for resolving a conflict over the multicast address.

17. The system of claim 11 wherein the assignment function comprises a removal function for removing the multicast address from the pool.

18. The system of claim 11 wherein the unused multicast addresses are allocated to the computer network, but not used by any computer on the computer network.

19. The system of claim 11 wherein the data stream content includes audio data.

20. The system of claim 11 wherein the data stream content includes video data.

21. In a network of computers interconnected by a network structure that includes a plurality of allocated multicast addresses, a method of assigning a multicast address to a data stream for propagation content through the network structure, comprising:
    identifying a plurality of allocated multicast addresses that are not being used by any computer on the network;

grouping the identified unused multicast addresses into a pool;

in response to a request for a multicast address to communicate a data stream, removing a multicast address from the pool without regard to the content of the data stream; and assigning the removed multicast address to the data stream.

22. The method of claim 21 further comprising:

deassigning the assigned multicast address from the data stream; and returning the deassigned multicast address to the pool.

23. The method of claim 21 wherein removing comprises randomly selecting the multicast address from the pool.

24. The method of claim 21 further comprising resolving a conflict over the removed multicast address.

25. The method of claim 21 wherein the data stream content includes audio data.

26. The method of claim 21 wherein the data stream content includes video data.

27. In a network of computers interconnected by a network structure that includes a plurality of allocated multicast addresses, a method of associating a multicast address with a data stream for propagating content through the network structure, comprising:

associating an unused multicast address with a data stream without regard to the content of the data stream.

28. The method of claim 27 wherein the data stream includes audio data.

29. The method of claim 27 wherein the data stream includes video data.

30. The method of claim 27 wherein associating comprises randomly selecting the unused multicast address.

31. The method of claim 27 further comprising resolving a conflict over an unused multicast address.

32. The method of claim 27 wherein associating is responsive to a request for transmission of the data stream.

33. On a computer network, a system of assigning a multicast address to a data stream for communicating content over the computer network, comprising:

a means for grouping a plurality of unused multicast addresses into a pool; and a means for assigning a multicast address from the pool to a data stream without regard to the content of the data stream.

34. The system of claim 33 further comprising:

a means for deassigning the assigned multicast address from the data stream.

35. The system of claim 34 wherein the deassigning means comprises a means for returning the multicast address to the pool.

36. The system of claim 33 wherein the assigning means is responsive to a request for transmission of the data stream.

37. The system of claim 33 wherein the assigning means randomly selects the multicast address.

38. The system of claim 33 further comprising a means for resolving a conflict over the multicast address from the pool.

39. The system of claim 33 wherein the assigning means comprises a means for removing the multicast address from the pool.

40. The system of claim 33 wherein the unused multicast addresses are allocated to the computer network, but not used by any computer on the computer network.

41. The system of claim 33 wherein the data stream content includes audio data.

42. The system of claim 33 wherein the data stream content includes video data.

43. In a network of computers interconnected by a network structure that includes a plurality of allocated multicast addresses, a system for assigning a multicast address to a data stream for communicating content through the network structure, comprising:

an identification function for identifying a plurality of allocated multicast addresses that are not being used by any computer on the network;

a pool function for grouping the identified unused multicast addresses into a pool;

a removal function responsive to a request for a multicast address to communicate a data stream for removing a multicast address from the pool without regard to the content of the data stream; and an assignment function for assigning the removed multicast address to the data stream.

44. The system of claim 43 further comprising:

a deassignment function for deassigning the assigned multicast address from the data stream; and a return function for returning the deassigned multicast address to the pool.

45. The system of claim 43 wherein the removal function randomly selects the multicast address from the pool.

46. The system of claim 43 further comprising a resolver function for resolving a conflict over the removed multicast address.

47. The system of claim 43 wherein the data stream content includes audio data.

48. The system of claim 43 wherein the data stream content includes video data.

49. The system of claim 48 wherein the data stream includes audio data.

50. In a network of computers interconnected by a network structure that includes a plurality of allocated multicast addresses, a system for associating a multicast address with a data stream for communicating content through the network structure, comprising:

a system for associating an unused multicast address with a data stream without regard to the content of the data stream.

51. The system of claim 50 wherein the data stream includes video data.

52. The system of claim 50 wherein the unused multicast address is randomly selected.

53. The system of claim 50 wherein a conflict over an unused multicast address is resolved.

54. The system of claim 50, responsive to a request for transmission of the data stream.

55. In a network of computers interconnected by a network structure that includes a plurality of allocated multicast addresses, a system for assigning a multicast address to a data stream for communicating content through the network structure, comprising:

a means for identifying a plurality of allocated multicast addresses that are not being used by any computer on the network;

a means for grouping the identified unused multicast addresses into a pool;

a means, responsive to a request for a multicast address to communicate a data stream, for removing a multicast address from the pool without regard to the content of the data stream; and a means for assigning the removed multicast address to the data stream.

56. The system of claim 55 further comprising:

a means for deassigning the assigned multicast address from the data stream; and a means for returning the deassigned multicast address to the pool.

57. The system of claim 55 wherein the removing means comprises a means for randomly selecting the multicast address from the pool.

58. The system of claim 55 further comprising a means for resolving a conflict over the removed multicast address.

59. The system of claim 55 wherein the data stream content includes audio data.

60. The system of claim 55 wherein the data stream content includes video data.

61. In a network of computers interconnected by a network structure that includes a plurality of allocated multicast addresses, a system for associating a multicast address with a data stream for communicating content through the network structure, comprising:

associating an unused multicast address with a data stream without regard to the content of the data stream.

62. The system of claim 61 wherein the data stream includes audio data.

63. The system of claim 61 wherein the data stream includes video data.

64. The system of claim 61 wherein the associating means comprises a means for randomly selecting the unused multicast address.

65. The system of claim 61 further comprising a means for resolving a conflict over an unused multicast address.

66. The system of claim 61 wherein the associating means is responsive to a request for transmission of the data stream.

* * * * *